United States Patent [19]
Ohtani et al.

[11] Patent Number: 5,563,005
[45] Date of Patent: Oct. 8, 1996

[54] BATTERY PACK HAVING PROTECTED TERMINALS AND CONNECTION MECHANISM

[75] Inventors: Tetsuya Ohtani, Yokohama; Yoshiharu Uchiyama, Isehara; Toshitsugu Mito, Atsugi, all of Japan

[73] Assignee: International Business Machines Corporation, Armonk, N.Y.

[21] Appl. No.: 453,744

[22] Filed: May 30, 1995

[30] Foreign Application Priority Data

Jul. 29, 1994 [JP] Japan .................................. 6-178708

[51] Int. Cl.$^6$ .............................. H01M 2/10; H05K 5/02
[52] U.S. Cl. .............................. 429/96; 429/98; 429/100; 429/163; 395/750
[58] Field of Search .............................. 429/96, 98, 100, 429/163; 395/750

[56] References Cited

U.S. PATENT DOCUMENTS

5,208,116  5/1993  Joh ............................................. 429/96
5,422,784  6/1995  Wakahara et al. ........................... 361/680

*Primary Examiner*—Stephen Kalafut
*Assistant Examiner*—Richard H. Lilley, Jr.
*Attorney, Agent, or Firm*—Martin J. McKinley

[57] ABSTRACT

A battery pack has a plurality of slits located on an edge surface of the pack. Electrical terminals are positioned completely within the boundaries of the slits to protect the battery pack from electrical shorts in the event the pack comes into contact with an extraneous metal object, such as a coin or key. The slits extend all the way thorugh the battery pack, from the bottom surface to the top surface, such that the slits are open on three sides. This permits the battery pack to be attached to and detached from a mating connector in any one of three directions; specifcally, perpendicular to the upper surface of the battery pack, perpendicular to the lower surface of the pack, and perpendicular to the edge surface.

8 Claims, 9 Drawing Sheets

BATTERY PACK HAVING PROTECTED TERMINALS AND CONNECTION MECHANISM

BACKGROUND OF THE INVENTION

Applicants claim the foreign priority benefits under 35 U.S.C. 119 of Japanese Application Serial No. 6-178708, which was filed Jul. 29, 1994. This Japanese Application and its translation are incorporated into this Application by reference.

The present invention relates to a battery pack and a connection mechanism for the battery pack and, more particularly, to a battery pack that can be detachably installed in an electric/electronic device, such as a portable personal computer, and a connection mechanism for such a battery pack.

Portable computers, such as personal notebook computers, that are made compact and light for portability, have come into wide use. Many types of portable computer designs include packaged batteries or "battery packs", which are portable personal computer, and a connection mechanism for such a battery pack.

Portable computers, such as personal notebook computers, that are made compact and light for portability, have come into wide use. Many types of portable computer designs include packaged batteries or "battery packs", which are detachably installed into the portable computer to permit operation where there are no commercial power sources available.

Figure 11:
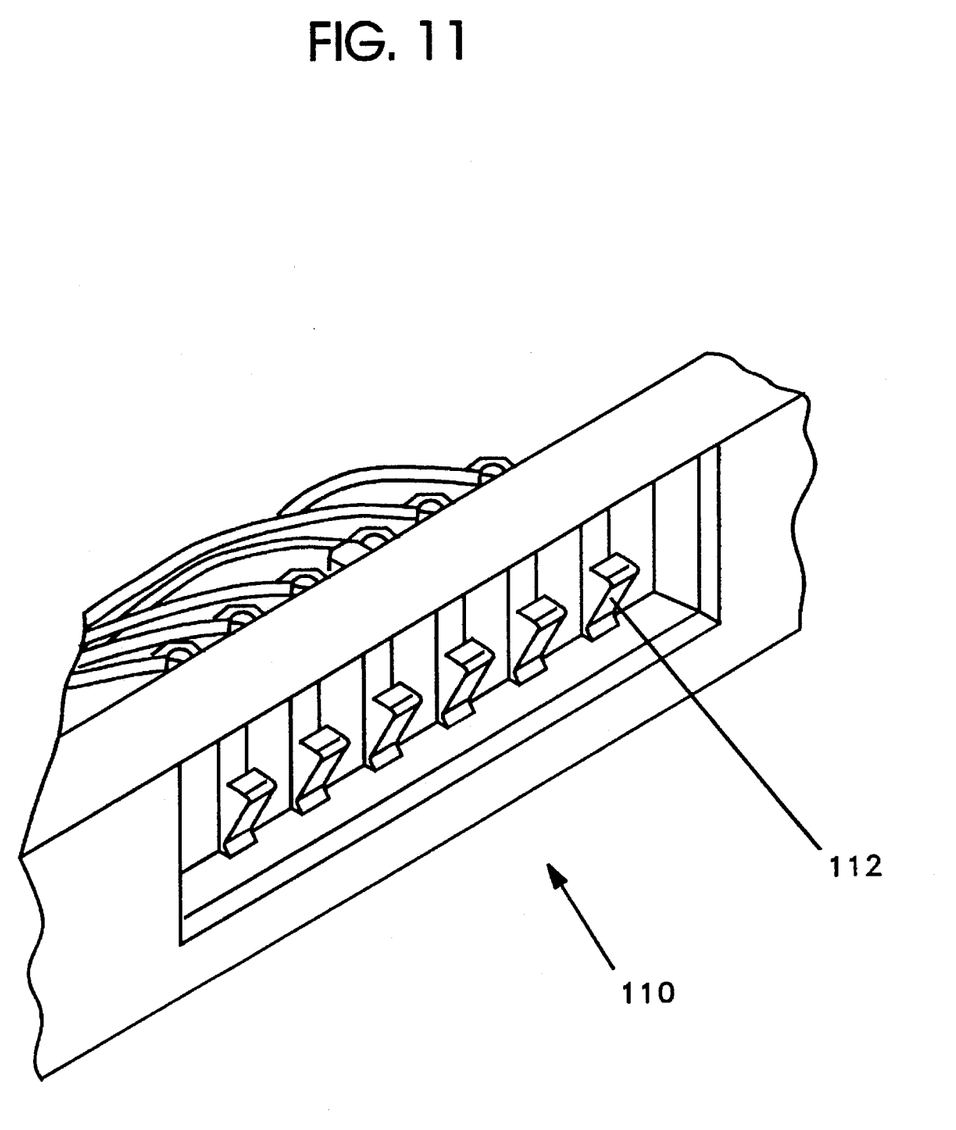
FIG. 11 is a perspective view illustrating a conventional mating connector, which employs metal springs, installed in a personal computer.

As shown in FIG. 11, many conventional portable computer battery packs have a plurality of terminals that are exposed on the outside of the casing of a battery pack (not shown), and a plurality of metal springs 112 that connect to the terminals of the battery pack are provided at a connection portion 110 in the portable computer.

To decrease the contact resistance between the terminals and the metal springs and to reduce heat, etc., at the contact point, the exposed area of the terminals of the battery pack must be large. However, with the above described conventional structure, when the battery pack is to be carried separately, articles made of metal, such as a chain or a key, may accidentally contact the terminals, causing a short circuit across the terminals of the battery pack.

As a security measure to shield the terminals of the battery pack so that they are not exposed, a technique is known wherewith slits or box recesses are provided in that portion of the electric/electronic device that connects to the terminal portion for the battery pack, and the terminals are located inside these recesses so that they cannot easily be contacted from the outside.

However, for those battery packs that have their electric/electronic device contact faces formed in a slit or a box shaped recess, ease of detachment and removability of conventional battery packs from the electric/electronic devices can be a problem. It would be desireable to detach and remove a battery pack from an electric/electronic device in any one of three directions; specifically, from the top, from the bottom, and from the side. However, detachment and removal of conventional battery packs can only be effected in one or two directions.

5. Objectives

To resolve the above described shortcomings, it is an object of the present invention to provide a battery pack for which improved ease of detachment and removal from an electric/electronic device is ensured and to provide a connection mechanism for the battery pack.

SUMMARY OF THE INVENTION

It is an object of the invention to provide an improved battery pack for use in an electrical/electronic device, such as a portable computer.

It is another object of the invention to provide a battery pack having terminals that are protected from accidental shorts when the battery is removed from the electrical/electronic device.

It is another object of the invention to provide a battery pack that can be easily removed and detached from an electrical/electronic device.

It is another object of the invention to provide a battery pack that can be removed from an electrical/electronic device in any one of three directions.

It is another object of the invention to provide a connector to connect such an improved battery pack to an electrical/electronic device.

These and other objects of the invention will be better understood by reference to the drawings figures and the following specification.

Briefly, the invention is a battery pack having a housing with an upper surface, a lower surface, and at least one edge surface. A plurality of slits are located in the edge surface. These slits extend completely through the battery pack; from the lower surface to the upper surface. Thus, the slits are open on htree sides; specifically, at the top (adjacent the upper surface), at the bottom (adjacent the bottom surface) and on the side (adjacent the edge surface). A plurality of electrical terminals are positioned inside the slits. These terminals are confined within and do not extend beyond the upper, lower and edge surface boundaries of the slits. Thus, because the terminals are located entirely within the slits, the battery pack is protected against inadvertent electrical shorts that might otherwise result from the contact of extraneous metal objects with the battery pack. This battery pack can also be attached to or detached from a mating electrical connector in any one of three directions; specifically, in a first direction perpendicular to the upper surface of the battery pack, in a second direction perpendicular to the lower surface of the battery pack, and in a third direction perpendicular to the edge surface.

DESCRIPTION OF THE ILLUSTRATIVE EMBODIMENTS

The preferred embodiment of the present invention will now be described in detail while referring to the accompanying drawings.

Figure 1:
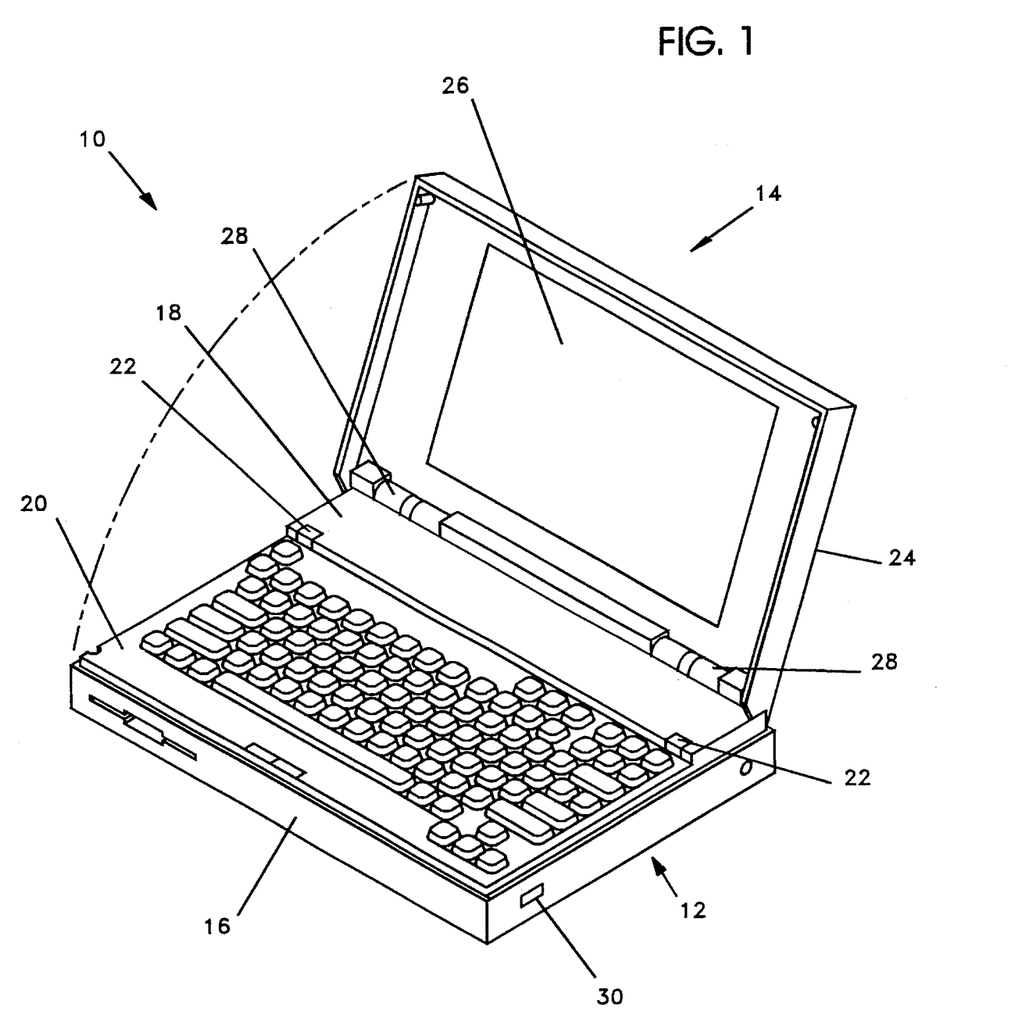
FIG. 1 is a perspective view illustrating an electric/electronic device; specifically, a portable personal computer.

FIG. 1 is a diagram illustrating a notebook personal computer (hereafter referred to as a "personal computer") 10 that serves as an electric/electronic device according to the present invention. The personal computer 10 comprises a thin body 12 and a cover 14 that is pivotally attached to the body 12 so that it can be opened and closed. The cover 14 has a case with a shallow bottom (a double bottom) 24, and paired cylindrical protrusions 28 are integrally formed with the case 24 at its ends. The paired protrusions 28 are rotatably supported at the body 12, so that the cover 14 is hinged and rotatably supported by the paired protrusions 28. A liquid crystal display 26 is provided in the center of the cover 14 when it is open.

The body 12 has a shallow case 16. A support plate 18, which has a predetermined width, is attached to the case 16 to cover the opening of the case 16 at the back, and a keyboard 20 is so installed that it covers the front of the opening. Paired protrusions 22 that have a tongue shape are integrally formed on each end of the keyboard 20 at the back. The paired protrusions 22 are supported at the ends of the front of the support plate 18, so that the keyboard 20 is hinged at the support plate 18 and is rotatably supported by the paired protrusions 22. The opening and closing of the cover 14 relative to the body 12, or the opening and closing of the keyboard 20 relative to the case 16 of the body 12 is performed by the 2-step manipulation of an opening/closing operation portion 30 that is provided on the side of the case 16.

Figure 2:
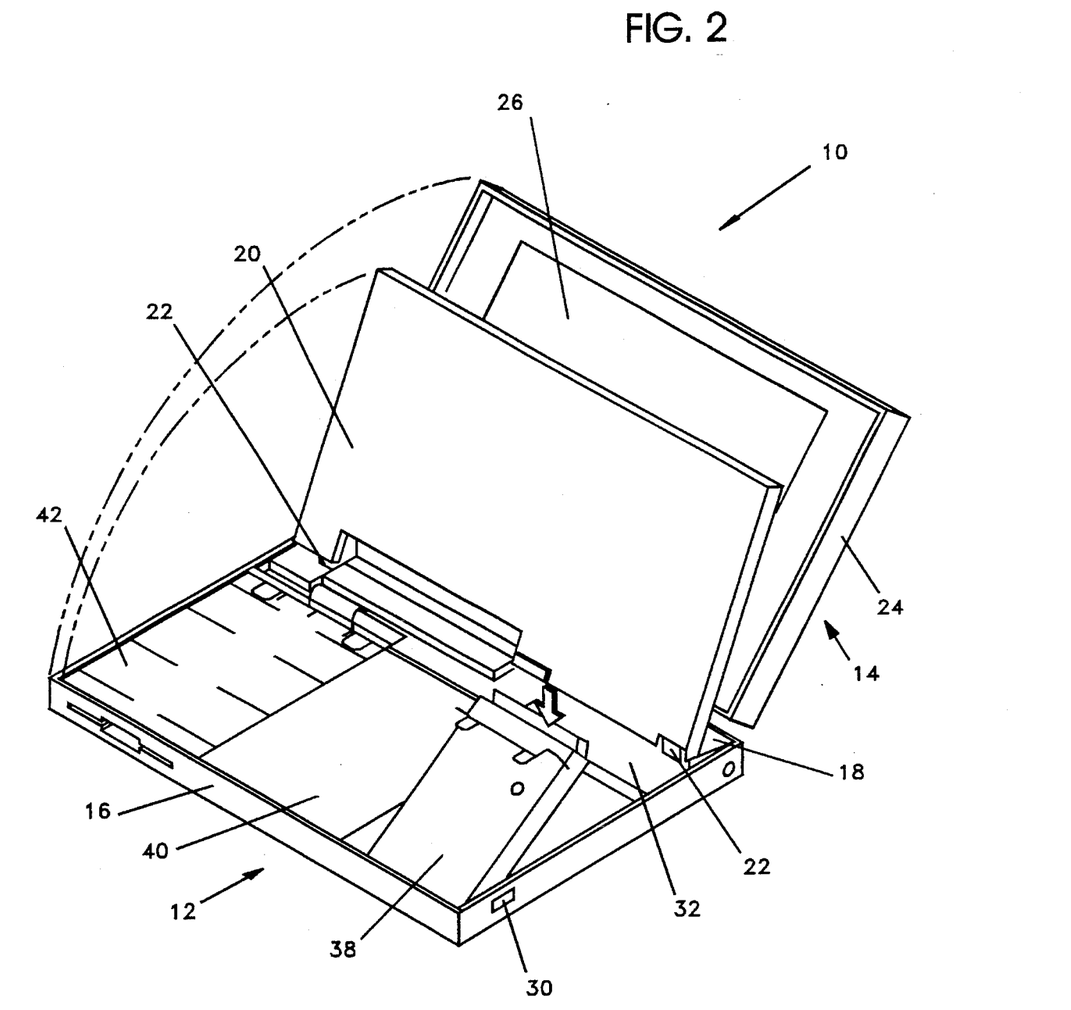
FIG. 2 is a perspective view illustrating the personal computer with its keyboard lifted, exposing an installed battery pack.

As is shown in FIG. 2, a partition 32, which is formed by bending a thin metal plate into a predetermined shape, is provided at the back in the case 16 of the body 12. Above the partition 32 is positioned an internal circuit that includes a system which will be described later. In front of the partition 32 are defined spaces for holding an HDD (Hard Disk Drive) pack 38, a battery pack 40, and an FDD (Floppy Disk Drive) pack 42. The packs 38, 40, and 42 are detachable and removable from the body 12, and are electrically connected to the system via connectors (not shown) when they are installed as are shown in FIG. 2. It should be noted that in FIG. 2 the battery pack 40 and the FDD pack 42 are installed.

The structure of the battery pack 40 will now be explained.

Figure 3:
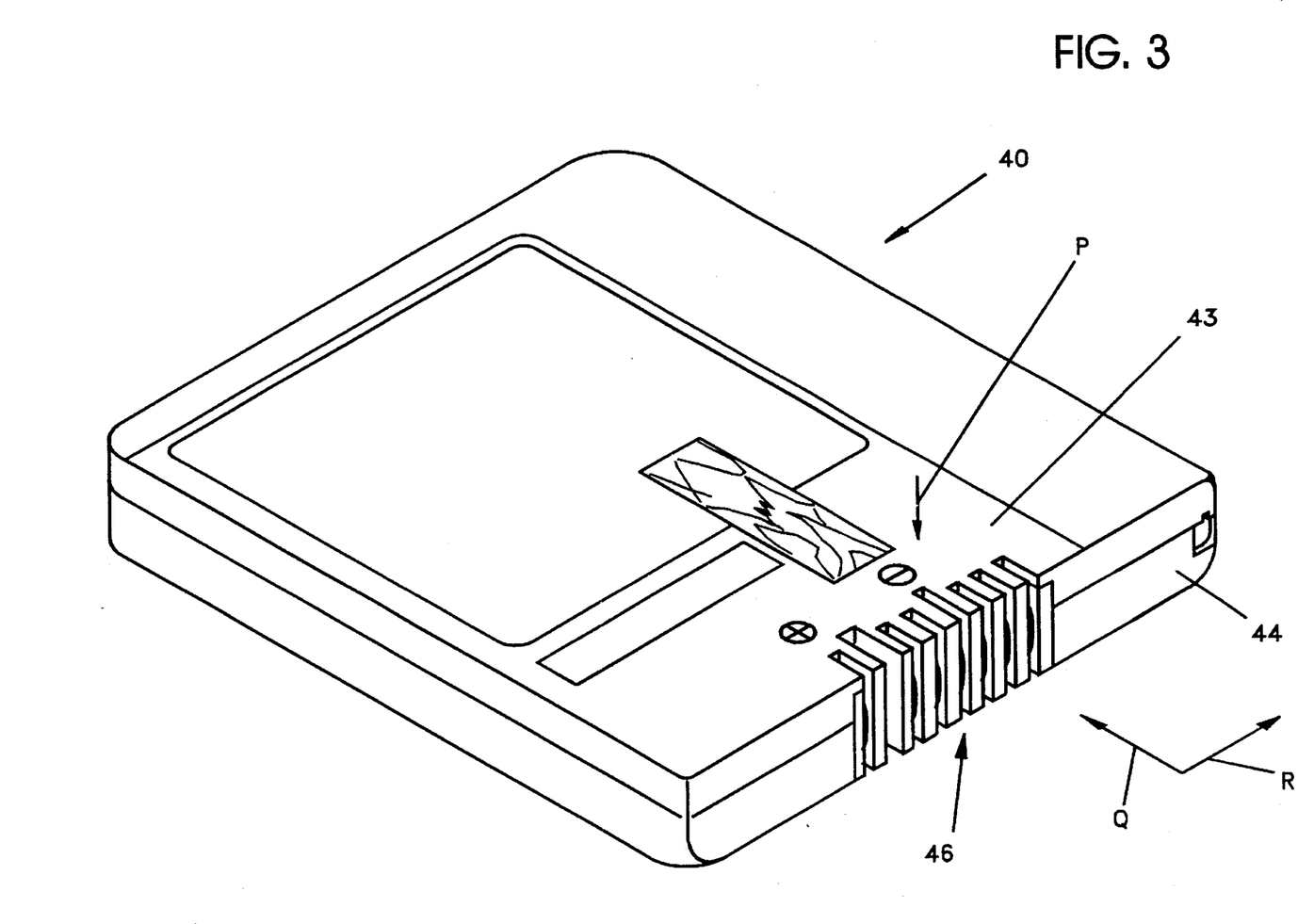
FIG. 3 is a perspective view of a battery pack of the present invention.

As shown in FIG. 3, a plurality of slits, which serve as a head 46, are formed in the center of one side surface 44 of the flat battery pack 40 in the direction that is indicated by the arrow R. The slits extend fully through the battery pack 40 in the direction of its thickness (in the direction indicated by the arrow P) and are open at three surfaces of the battery pack 40: a top surface 43, the side 44, and a bottom surface (not shown). The head 46 will now be explained while referring to FIGS. 4 through 6.

Figure 4:
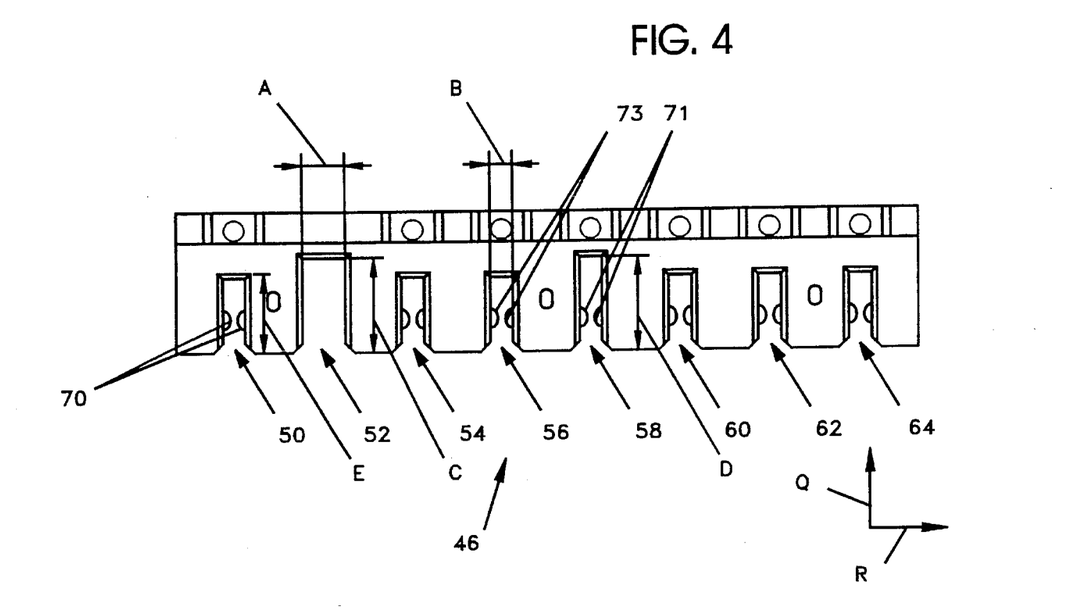
FIG. 4 is a top view of the slits of the battery pack.

As shown in FIG. 4, slits 50, 52, 54, 56, 58, 60, 62, and 64 are formed in the head 46 so that they extend fully through the battery pack 40 in the direction of its thickness (the direction that is perpendicular to the surface of FIG. 4). Positive paired terminals 70 are located on the internal side walls of the slit 50 and are exposed a predetermined length. Likewise, negative paired terminals 71 are located on the internal side walls of the slit 58 and are exposed a predetermined length. Further, paired terminals 73 for a control signal are located on the internal side walls of the individual slits 54, 56, 60, 62, and 64 and are exposed a predetermined length. The paired terminals 73 are employed for the exchange of information, such as the remaining capacity of a battery, between the personal computer 10 and the battery pack 40. The slit 52 is employed for the insertion of a guide which will be described later. No terminals are provided in the slit 52.

As for the depths of the slits in the direction indicated by the arrow Q, the depth (size C) of the slit 52 and the depth (size D) of the slit 58 are greater than the depths (size E) of the other slits.

As for the widths of the slits in the direction indicated by the arrow R, the width (size A) of the slit 52 is greater than the widths (size B) of the other slits.

The slit 52, for the insertion of a guide into the head 46, is off-centered in the direction opposite to that indicated by the arrow R.

Figure 5:
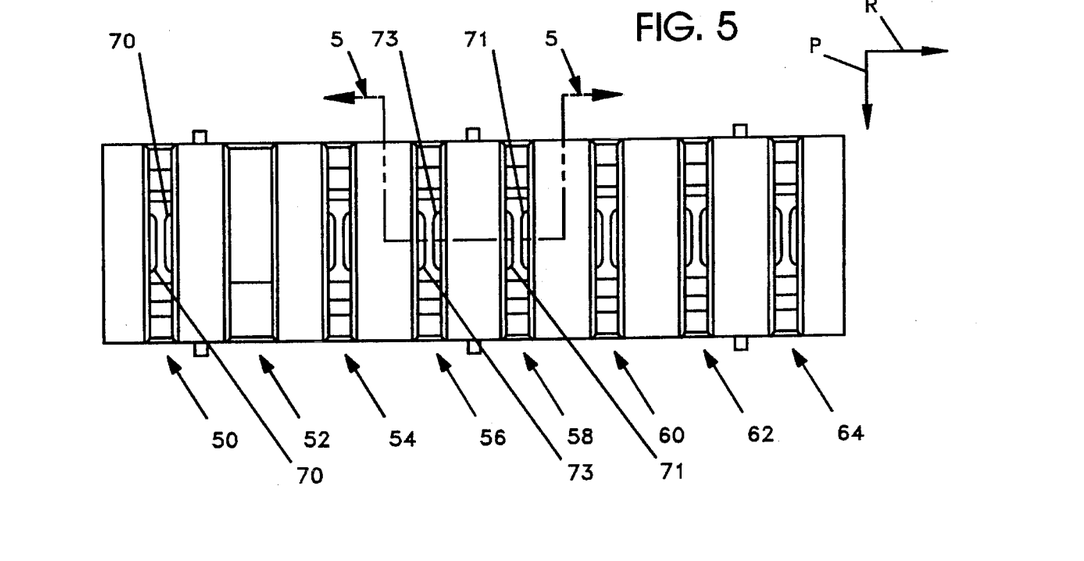
FIG. 5 is a front view of the slits of the battery pack.

As is shown in FIG. 5, portions of the positive terminals 70, the negative terminals 71, and the terminals 73, for a control signal, that have a predetermined size are exposed at the center of the respective slits in the direction of the thickness of the battery pack 40 (in the direction indicated by the arrow P).

Figure 6:
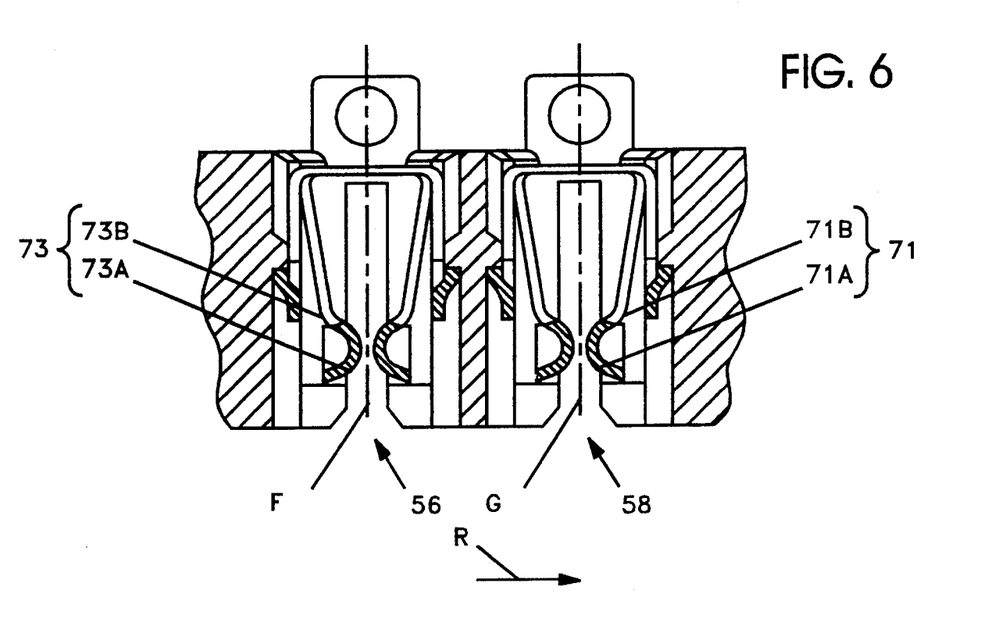
FIG. 6 is a cross sectional view taken along the line 5—5 of FIG. 5.

As is shown in FIG. 6, the metal terminals 73 for a control signal are located almost symmetrically along either side of the center line F of the slit 56 in the direction indicated by the arrow R, while the external surfaces of paired exposed portions 73A, which are bent into arced shapes, face each other. Likewise, the metal negative terminals 71 are located almost symmetrically along either side of the center line G of the slit 58 in the direction indicated by the arrow R, while the external surfaces of the paired exposed portions 71A, which are bent in arced shapes, face each other. The metal positive terminals 70 (not shown) are located in the same manner.

Figure 7:
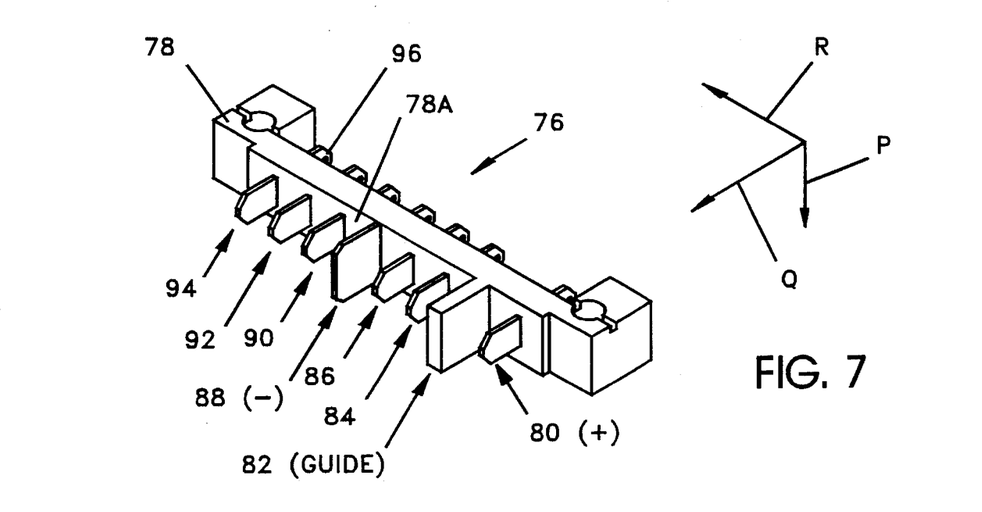
FIG. 7 is a perspective view illustrating the connector in the personal computer that mates with the battery pack.

As is shown in FIG. 7, a battery interface (hereafter referred to as a "battery I/F") 76 serves as the second connector, which may be mounted in the personal computer 10. The battery I/F 76 comprises a plug 80 having a positive polarity, a plug 88 having a negative polarity, plugs 84, 86, 90, 92, and 94 for control signals, a plastic (insulating) waist portion 78, and a plastic (insulating) guide 82, which is formed flat in the direction indicated by the arrow R in the same manner as are the plugs. These plugs and the guide are so positioned that they are aligned and mate with the above described slits. The plug 80, which has positive polarity, the plug 88, which has negative polarity, and the plugs 84, 86, 90, 92, and 94, for a control signal, are fitted perpendicularly to the side 78A of the waist portion 78. Connection terminals 96, which are the tails of the plugs, are provided on the opposite side of the waist portion 78 and are employed for making connection with the circuit of the personal computer 10. The guide 82 is formed as a segment of the waist portion 78 and it is perpendicular to the side surface 78A.

The sizes of the plugs and the guide will be described below.

As to their sizes in the direction indicated by the arrow Q, i.e., their lengths, the guide 82 and the plug 88, which has negative polarity, are longer than the other plugs. The guide 82 is slightly longer than the plug 88, which has negative polarity. As to the sizes in the direction indicated by the arrow P, the sizes of the guide 82 and the plug 88, which has negative polarity, are greater than those of the other plugs.

As to the sizes in the direction indicated by the arrow R, the size (thickness) of the guide 82 is greater than the sizes (thicknesses) of the other plugs.

Further, the guide 82 is so located that it is off-centered relative to the center of the battery I/F 76 in the direction opposite to that indicated by the arrow R.

Figure 9A:
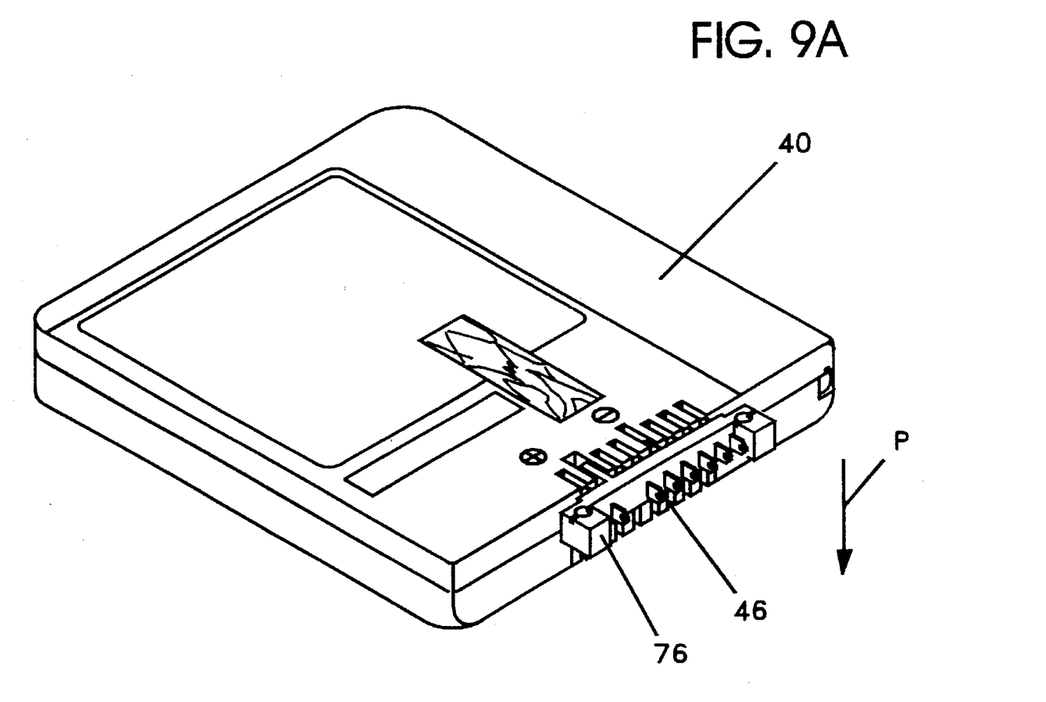
FIGS. 9A and 9B are perspective views showing different states wherein the battery pack is attached to the mating connector.

In addition, as is shown in FIG. 9A, the size of the battery I/F 76 in the direction indicated by the arrow P is not greater than the thickness of the battery pack 40.

The operation of the embodiment will now be explained while referring to the accompanying drawings.

To install the battery pack 40 in the personal computer 10, the plugs and the guide that are formed on the battery I/F 76 are inserted into the corresponding slits that are formed in the head 46 of the battery pack 40. The plug 88 on the computer side that has negative polarity, and which is the longest plug (greatest in the direction indicated by the arrow Q in FIG. 7), first abuts upon the exposed portions 71A of the negative terminal 71 of the battery pack 40. The plug 88 then contacts the external bent surfaces of the paired exposed portions 71A, while it pushes the exposed portions 71A toward the side walls of the slit. At this time, pressure is exerted inward, toward the center of the slit, by the paired exposed portions 71A, which is counter to the pressure that is exerted outward, toward the side walls of the slit, and this pressure holds the plug 88 between the paired exposed portions 71A.

When the plugs of the battery I/F 76 are further inserted into the slits, the plug 80 that has positive polarity abuts upon the paired positive terminals 70, and slides in and contacts the external bent surfaces of the exposed portions of the positive terminals 70, and thereafter presses the exposed portions of the paired positive terminals 70 toward the side walls of the slit. At this time, as is in the case described above, pressure is exerted inward, toward the center of the slit by the exposed portions (not shown) of the paired positive terminals 70, which is counter to the pressure that is exerted outward, toward the side walls of the slit. The plug 80, which has positive polarity, is held by this pressure.

As described above, the plug 88 that has negative polarity, and the plug 80 that has positive polarity are held by the exposed portions of the paired terminals 70 and 71. The contact area for each plug is greater than that of a conventional terminal that contacts only one surface, and contact failures can thus be prevented. Further, as contact resistance is decreased, the generation of heat is accordingly reduced.

When the side surface 44 of the battery pack 40 is in contact with the side surface 78A of the waist portion 78, the installation of the battery pack 40 into the personal computer 10 is complete.

As is apparent from the above explanation, since the negative terminal 71, which is a ground terminal, contacts its corresponding plug earlier than the positive terminal 70 does, a circuit (not shown) in the battery pack 40 can be stabilized. This is especially effective for the battery pack when a controller that controls the charging of a battery is provided.

Almost at the same time as the plug 80 that has positive polarity contacts the paired terminals 70, the plugs 84, 86, 90, 92, and 94 for a control signal abut upon the respective terminals 54, 56, 60, 62, and 64 for a control signal, and slide in and contact the internal surfaces of the exposed portions of the related terminals, while simultaneously pressing the exposed portions of the terminals toward the side walls of the slits. At this time, as well as in the above described case, pressure inward, toward the center of the slit, which is counter to the pressure that is exerted outward, toward the side walls of the slit, is exerted by the exposed portions of the terminals in each slit (only the exposed portions 73A are shown in FIG. 6). The individual plugs are held by this pressure.

Therefore, as well as in the previously described cases, the contact failures between the terminals for control signals and the plugs can be prevented.

Figure 8:
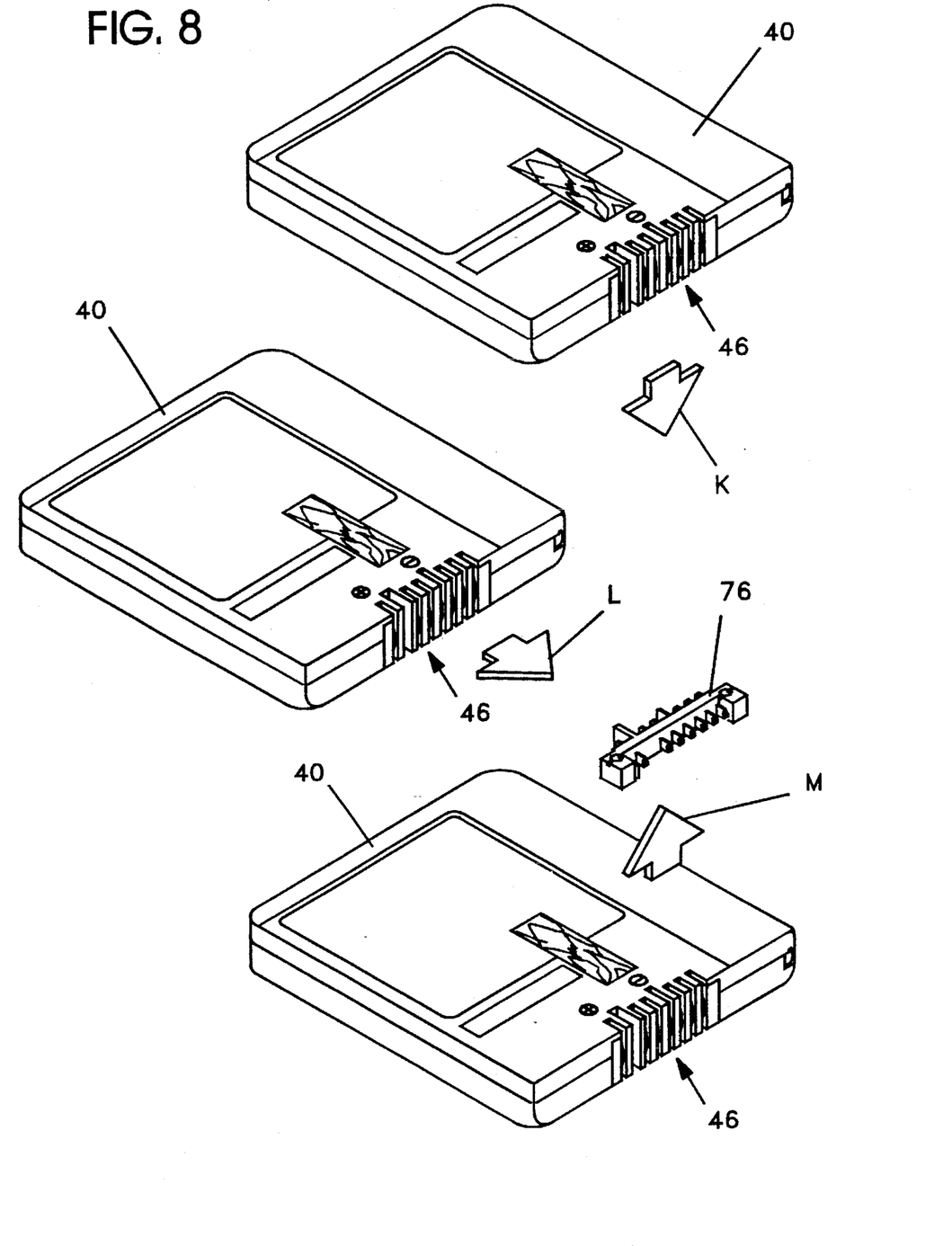
FIG. 8 is a diagram showing the three basic directions in which the battery pack can be connected to the connector in the personal computer.

In this embodiment, because of the side walls of the case 16 of the personal computer 10, the direction in which the head 46 of the battery pack 40 is to be attached to the battery I/F 76 is limited to the direction indicated by the arrow K shown in FIG. 8. However, since the slits formed in the battery pack 40 open onto three surfaces: the top surface, the bottom surface, and one side surface, the head 46 of the battery pack 40 can be attached to the battery I/F 76 in the direction indicated by either arrow K, arrow L, or arrow M, as is shown in FIG. 8, or diagonally from above (not shown) or diagonally from below (not shown).

The battery pack 40 of the present invention is applicable for various electric/electronic devices that require battery packs to be installed from different directions only if the battery I/F 76 of the present invention or another interface with a similar arrangement is installed on these devices.

Further, since the negative terminal 71 and the positive terminal 70 on the side of the battery pack 40 are located inside of the slits so that they are not exposed, inconveniences that arise due to the short-circuiting of terminals can be prevented while a battery pack is carried separately, or is connected to an electric/electronic device.

In addition, the guide 82 that is formed of an insulating material is provided on the battery I/F 76 on the personal computer 10 side between the plug 80, which has positive polarity, and the plug 88, which has negative polarity. When a battery pack is connected to an electric/electronic device, the occurrence of inconveniences that arise due to the short-circuiting of terminals can be more effectively prevented.

Further, the guide 82 that is provided in the battery I/F 76 is longer than the other plugs of the battery I/F 76 (greater in the direction indicated by the arrow Q in FIG. 7), so that the guide 82 can be employed as a reference for positioning the head 46 when it is attached to the battery I/F 76 and insertion of the battery pack 40 is thus facilitated.

The thickness of the guide 82 on the battery I/F 76 is greater than the thicknesses of the other plugs, and the thicknesses of the slits in the head 46 correspond to the thicknesses of the guide 82 and the plugs. Since it is apparent that an inverted battery pack 40 cannot be installed in the personal computer 10, the inverted installation of the battery pack 40 in the personal computer 10 can be avoided.

Figure 9B:
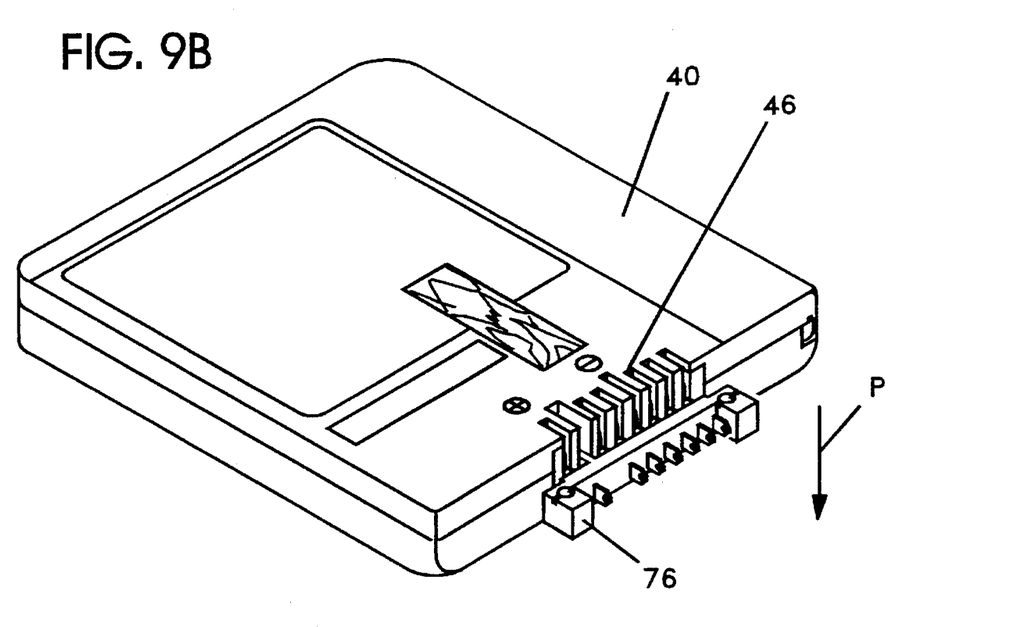

FIGS. 9A and 9B are diagrams showing the relative positional relationship between the battery pack 40 and the battery I/F 76 after the battery pack 40 is installed in the personal computer 10. As is shown in FIG. 9A, the size of the battery I/F 76 in the direction indicated by the arrow P (in the direction of the thickness of the battery pack 40) is smaller than the size of the head 46 in the same direction. It is therefore not necessary to insert the plugs and the guide of the battery I/F 76 into the slits of the head 46 so that they are centrally positioned in the direction indicated by the arrow P, and the contact surface allowances in the direction indicated by the arrow P (the direction of thickness of the battery pack 40) ensure a sufficient margin of freedom for the positioning of the plugs and the guide on the battery I/F 76 (freedom of connection positioning is obtained). Therefore, the battery pack 40 can be installed in the personal computer 10 even when, relative to the battery pack 40, there is a variation in the positioning for the inserted plugs and guide on the battery I/F 76.

Figure 10:
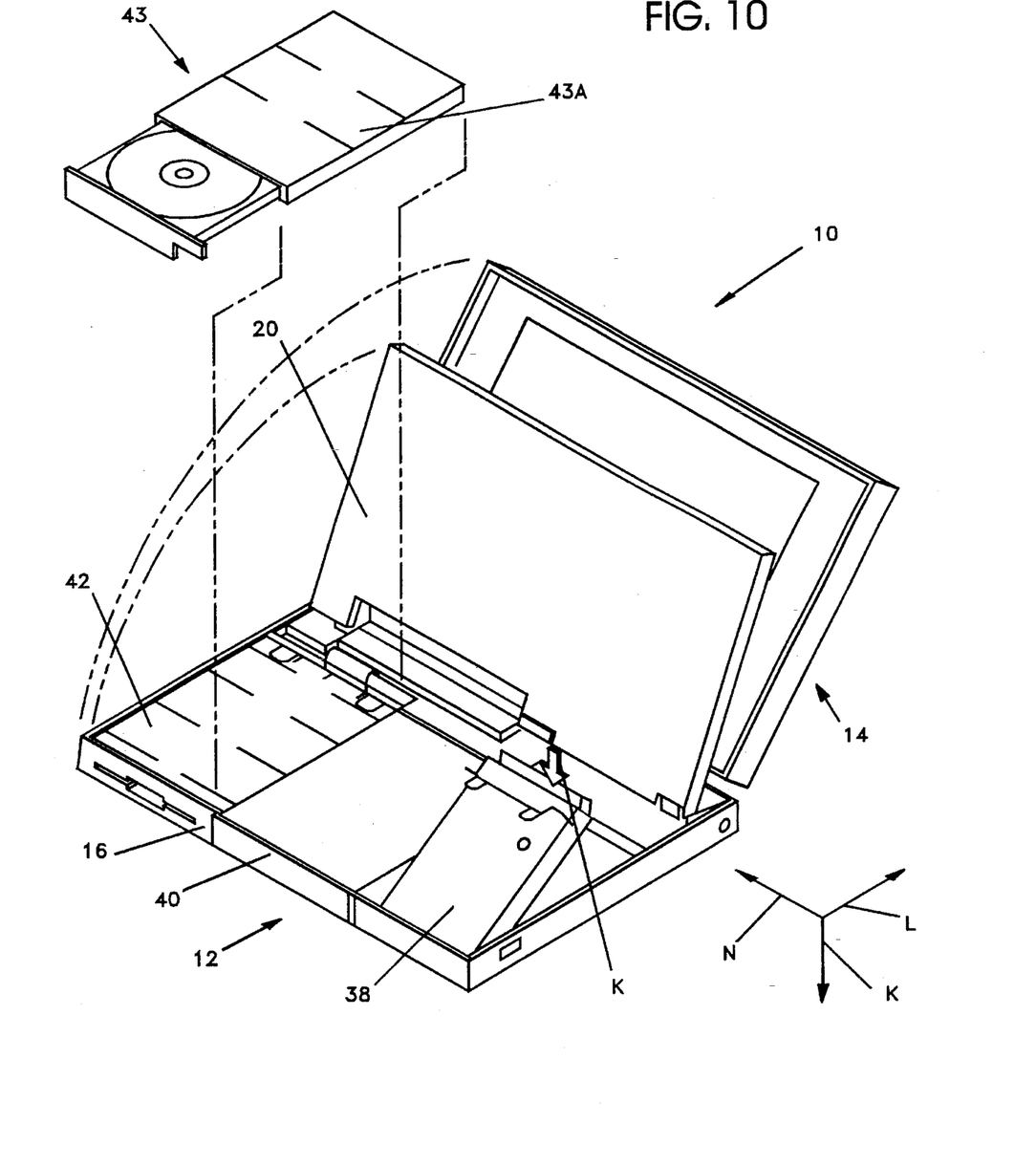
FIG. 10 is a diagram of a CD-ROM drive installed in the personal computer instead of a floppy disk drive.

In FIG. 10, the personal computer 10 is shown with a CD-ROM reader 43 mounted instead of the FDD pack 42.

Since it is necessary to ensure there is sufficient space for the CD-ROM reader 43, which has a width that is equal to or greater than the diameter of a CD-ROM disc, the width of the area allocated for the reader 43 is greater than that allocated for the FDD pack 42 in the direction indicated by the arrow N. The CD-ROM reader 43 is mounted in the personal computer 10 so that an end 43A of the CD-ROM reader 43 and the battery pack 40 slightly overlap.

In this case, the battery pack 40 cannot be installed from the top or from diagonally above, and must be installed from the bottom (the opposite of the personal computer 10) or from the front (through installation port 16A that is provided in a side face 16).

According to this embodiment, as described above, since the battery pack 40 can be inserted into the personal computer 10 from either of three directions: from the top, from the bottom, and from the side, it is possible to attach the battery pack 40 to the personal computer 10 wherein the CD-ROM reader 43 is mounted.

Although, in the preferred embodiment, a personal computer has been employed as an electric/electronic device, the present invention is not limited to this, and may be employed for another electric/electronic device; for example, a charger that changes a battery, a cordless device, such as a portable telephone or a cordless telephone, or a word processor.

When the plugs of an electric/electronic device are to be connected to the terminals of the battery pack, the plugs can be inserted into the slits from the top, from the bottom, or from the side of the battery pack, and the ease of detachment and removal from the electric/electronic device is very high.

Further, the battery pack of the present invention can also be used for various types of electric/electronic devices that require the battery packs to be installed from different directions.

Since terminals of the battery pack are so provided that they are not exposed outside the slits, a battery pack can be carried separately without short-circuiting the terminals by foreign material.

Since the slits of the first connector are so formed that they extend fully through the battery pack and are open at the top, at the bottom, and at one side, in the direction of the thickness of the battery pack, the plurality of protrusions of the second connector can be inserted from the top, from the bottom, or from the side of the battery pack into the corresponding slits of the first connector, and thus ease of the detachment from the electric/electronic device is very high.

In addition, the battery pack of the present invention can also be applied to various types of electric/electronic devices that require battery packs to be installed from different directions.

Since the terminals of the battery pack are so provided inside of the slits of the first connector so as not to be exposed externally, the battery pack can be carried separately without short-circuiting between the terminals by foreign material.

Further, as the flat protrusions can be inserted into the slits in one of three directions, and the plugs of the second connector slide and contact the terminals that are located inside of the slits of the first connector, a large contact area for the plugs and the terminals is ensured and the failures due to lack of contact can be prevented.

While the first connector is connected to the second connector, the length of the protrusions in the direction that corresponds to the direction of thickness of the battery pack is smaller than the thickness of the battery pack. It is therefore not necessary when the battery pack is installed for the protrusions of the second connector to be positioned at the center of the slits of the first connector in the direction of the thickness of the battery pack, and a margin of freedom in positioning of the protrusions on the second connector in the direction of the thickness of the battery pack is ensured (there is a margin of freedom for the installation position). Therefore, the battery packs can be installed in electric/electronic devices that have different installation positions for the protrusions on the second connectors.

A guide that is formed of an insulating material is provided between the plug of the second connector that contacts the positive terminal and the plug that contacts the negative terminal, and a slit that corresponds to the guide is provided in the first connector. Short-circuiting between the positive and negative terminals due to the entrance of foreign metal, etc., is prevented by the guide, and any inconvenience caused by the short-circuiting between the terminals is further prevented.

When there is an attempt to install the battery pack in an electric/electronic device backwards, the shapes of two connectors do not match and the battery pack cannot be installed. Therefore, the inverted installation of the battery pack into an electric/electronic device is avoided.

When the second connector is attached to the first connector, the negative terminal, which is ground terminal, is brought into contact first, and the circuit in the battery pack can be stabilized. This is effective for a mechanism wherein a controller that controls the charging of a battery is provided in a battery pack.

We claim as our invention:

1. A battery pack comprising:

a housing having an upper surface, a lower surface, and at least one edge surface;

a plurality of slits in said edge surface, said slits extending completely through said battery pack from said lower surface to said upper surface, such that said slits are open adjacent said upper, bottom and edge surfaces; and a plurality of electrical terminals positioned inside said slits, said terminals being confined within the upper, lower and edge surface boundaries of said slits, thereby providing protection against electrical shorts that might otherwise result from the contact of extraneous metal objects with the battery pack;

whereby said battery pack can be attached and detached from a mating connector in any one of three directions; specifically, in one direction perpendicular to said upper surface, in another direction perpendicular to said lower surface, and in a third direction perpendicular to said edge surface.

2. The battery pack of claim 1, further comprising a guide slot, the width of said guide slot being wider than the width of said slits.

3. The battery pack of claim 1, wherein the electrical terminal in a first slit has a negative polarity, and the electrical terminal in a second slit has a positive polarity, and wherein a guide slot is located in said edge surfcae between said first and second slits.

4. The battery pack of claim 1, wherein the depth of a first slit, which includes a terminal of a first polarity, is greater than the depth of a second slit, which includes a terminal of a second polarity.

5. A battery operated computer, comprising:

a display screen;

a keyboard;

a data storage device;

a connector for connection to a battery pack; and a battery pack comprising:

a housing having an upper surface, a lower surface, and at least one edge surface;

a plurality of slits in said edge surface, said slits extending completely through said battery pack from said lower surface to said upper surface, such that said slits are open adjacent said upper, bottom and edge surfaces; and a plurality of electrical terminals positioned inside said slits, said terminals being confined within the upper, lower and edge surface boundaries of said slits, thereby providing protection against electrical shorts that might otherwise result from the contact of extraneous metal objects with the battery pack.

6. The battery operated computer of claim 5, wherein said battery pack further comprises a guide slot, the width of said guide slot being wider than the width of said slits.

7. The battery operated computer of claim 5, wherein the electrical terminal in a first slit of said battery pack has a negative polarity, and the electrical terminal in a second slit of said battery pack has a positive polarity, and wherein said battery pack includes a guide slot located in said edge surface between said first and second slits.

8. The battery operated computer of claim 5, wherein the depth.of a first slit of said battery pack, which includes a terminal of a first polarity, is greater than the depth of a second slit of said battery pack, which includes a terminal of a second polarity.

* * * * *